Figure 1:
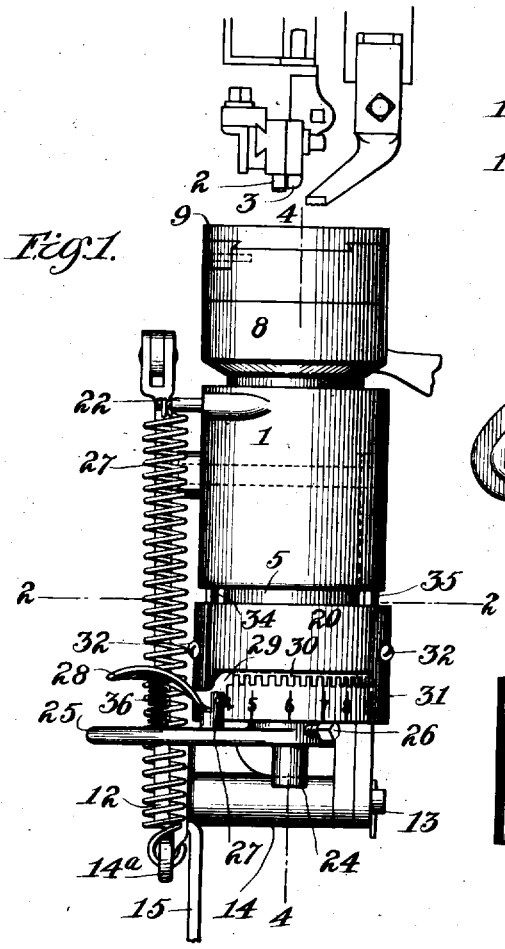

A. H. PRENZEL.

ADJUSTABLE WORK SUPPORT AND GAGE FOR CHANNELING MACHINES.

APPLICATION FILED AUG. 17, 1911.

Reissued Feb. 27, 1912.

13,375.

2 SHEETS—SHEET 1.

Witnesses

Wm. M. Rheems

Warren G. Ogden

Inventor

Adam H. Prenzel by Phillips Van Everen & Fish Attys

COLUMBIA PLANOGRAPH CO., WASHINGTON, D. C.

A. H. PRENZEL.

ADJUSTABLE WORK SUPPORT AND GAGE FOR CHANNELING MACHINES.

APPLICATION FILED AUG. 17, 1911.

Reissued Feb. 27, 1912.

13,375.

2 SHEETS—SHEET 2.

Witnesses.

Wm. M. Rheem.

Warren G. Ogden

Inventor

Adam H Prenzel by Phillips Van Orden & Fish

Attys.

COLUMBIA PLANOGRAPH CO., WASHINGTON, D. C.

UNITED STATES PATENT OFFICE.

ADAM H. PRENZEL, OF HALIFAX, PENNSYLVANIA, ASSIGNOR TO UNITED SHOE MACHINERY COMPANY, OF PATERSON, NEW JERSEY, A CORPORATION OF NEW JERSEY.

ADJUSTABLE WORK SUPPORT AND GAGE FOR CHANNELING-MACHINES.

13,375. Specification of Reissued Letters Patent. Reissued Feb. 27, 1912.

Original No. 965,656, dated July 26, 1910, Serial No. 559,310. Application for reissue filed August 17, 1911. Serial No. 644,712.

*To all whom it may concern:*

Be it known that I, ADAM H. PRENZEL, a citizen of the United States, residing at Halifax, in the county of Dauphin, State of Pennsylvania, have invented an Improvement in Adjustable Work Supports and Gages for Channeling-Machines, of which the following description, in connection with the accompanying drawings, is a specification, like characters on the drawings representing like parts.

My invention relates to improvements in means for supporting work to be channeled and for gaging the position at which the work is to be held, and it consists in the constructions, combinations and arrangements herein described and claimed.

In the process of channeling soles for shoes preparatory to sewing the upper to the sole, it is customary to run a channeling knife along the border of the sole, while at the same time making a recess on the outer edge of the sole. The needle for sewing the upper is passed through the shoulder formed by the recess and through the channeled portion, thus uniting the upper to the sole. After the upper is sewed to the sole the edge of the latter is burnished, or ironed, by means of an iron having a thickness which just equals the thickness of the exposed edge of the sole. The ordinary way of adjusting the machine to accommodate the thickness of the sole to be channeled is to raise or lower the supporting table and to clamp the same in position by means of a set screw, or other similar device. If the table is set too high the recess is made correspondingly deeper, and when the edge of the sole is burnished or ironed, the iron is liable to cut the upper. On the other hand, if the table should be set too low there will be a portion of the edge of the sole which will not be ironed. Each time that a new sole has to be channeled, if the thickness of the sole varies from that of the previous one, the table has to be reset. As stated above, this is done ordinarily by guess or by trial until the proper height is secured.

An object of my invention is to provide an adjustable work table for channeling machines by means of which the depth of the cut can be accurately gaged through the medium of a device which will set the table at a predetermined height, thereby doing away with all danger of injury to the shoe, or of turning out imperfect work.

A further object of my invention is to provide a device of comparatively simple construction, which may be used with channeling machines of the ordinary type, which has few parts and is consequently not liable to get out of order.

Other objects and advantages will appear in the following specification, and the novel features of the device will be particularly pointed out in the appended claims.

My invention is illustrated in the accompanying drawings forming part of this application, in which similar reference characters indicate like parts in the several views, and in which:—

Figure 2:
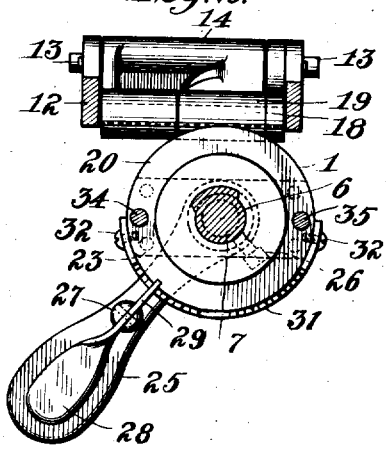
Figure 3:
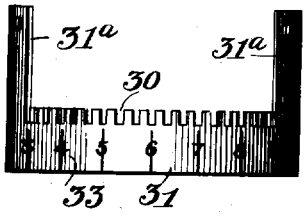
Figure 4:
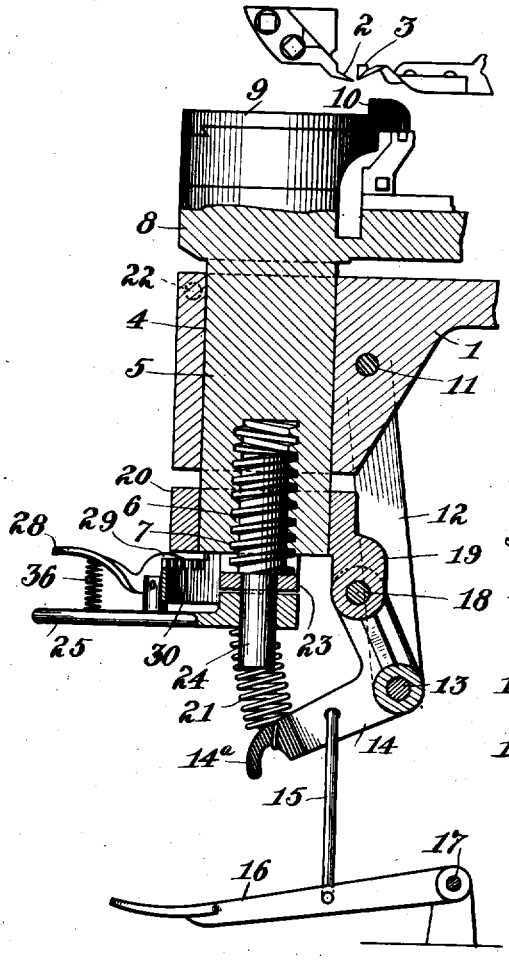
Figure 5:
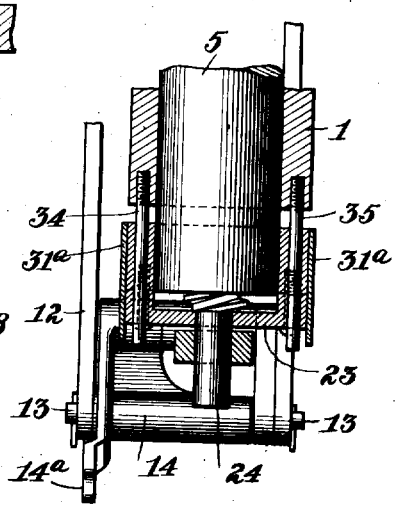

Figure 1 is a side view of the device, Fig. 2 is a section along the line 2—2 of Fig. 1, Fig. 3 is a front view of the gage, Fig. 4 is a section along the line 4—4 of Fig. 1, and Fig. 5 is a section at right angles to Fig. 4.

Referring now more particularly to Fig. 4, 1 denotes a part of the main frame of the channeling machine. This frame bears the channeling knife 2 and the knife 3 for forming the recess on the edge of the sole. In the figure I have not shown connection between the parts 1 and the parts 2 and 3, but it will be understood that these latter parts are attached to the frame 1.

The frame portion 1 is provided with a bore 4, in which the sliding spindle 5, of the work support operates. The spindle has a threaded recess 6, at its lower end, arranged to receive a worm 7, as clearly shown in Fig. 4. The upper part of the spindle 5 has an integral table 8, having a slidable plate 9, with an adjustable edge gage 10. The means for adjusting this edge gage forms no part of the present invention, since such devices are old.

Pivotally supported at 11, on the main frame 1, is a swinging arm 12, to the lower end of which is pivotally attached, at 13, a bell-crank lever 14. This lever is attached by means of a pull rod 15, to a foot lever 16, which is mounted upon a pivot, at 17. The upper end of the bell-crank lever is pivotally connected at 18, with a downwardly extending arm 19, of a collar 20, which surrounds the spindle 5. The bell-crank lever has a hooked end 14[a] which is connected by means of a spiral spring 21 to an arm 22 which projects from the main frame 1. This spring tends normally to hold the lower end of the lever in a raised position.

Secured to the under side of the collar 20 is a bridge 23. The worm 7 terminates at this bridge, but the integral shaft upon which the worm is made, projects through the bridge, as shown at 24. Upon the shaft 24, below the bridge, is secured a handle 25, by means of a set screw 26. This handle bears an upright 27 to which is pivotally secured a latch member 28. The end of the latch member 28 is provided with a tooth 29 arranged to enter recesses 30 in an arc shaped gage member 31, which is secured to the collar 20 by means of the screws 32 which pass through extensions 31[a]. The gage is provided with a series of indicating characters 33 as shown in Figs. 1 and 3.

The collar 20 is arranged for movement toward and away from the frame member 1, and in order to guide it in its movement I provide the guide rods 34 and 35 respectively which are secured in the lower end of the frame member 1 and which pass through openings in the collar 20, as shown in Fig. 5.

From the foregoing description of the various parts of the device, the operation thereof may be readily understood. In channeling a sole of given thickness, the latch 28 is pressed downwardly toward the handle 25, against the tension of the spring 36. The handle is then shifted until the tooth 29 comes opposite the recess 30 of the gage 31 which corresponds to the thickness of the sole to be channeled. The movement of the handle to the right or left will turn the worm 7 which will shift the relative position of the spindle 5 with respect to the collar 20, the bridge 23 on the latter acting as an abutment against which the worm 7 bears for forcing the spindle up or down. The foot lever 16 is now depressed which will pull downwardly on the bell-crank lever 14, thereby causing the table to descend so as to permit the insertion of the sole between the plate 9 and the knives 2 and 3, the sole being pressed against the edge gage 10. Now when the pressure on the foot lever is relieved the spring 21 will cause the table to rise until the collar 20 comes into engagement with the lower edge of the frame 1. The table will now be at the proper height for channeling and for recessing the edge of the sole.

It will be seen from the foregoing description, that I have provided a device by means of which the raising and lowering of the table is accomplished with the utmost accuracy. There is no need of spoiling the work in an endeavor to find a proper position for the work supporting table by guessing or estimating the height at which it is to be set. Moreover with soles of different thickness the table may be set so as to cut a groove of the same depth. In the ordinary method the table must be reset for soles of different thickness.

I claim:

1. In a work supporting table for channeling machines, a frame provided with a vertical bore, a table having a spindle arranged to slide in said bore and provided with a threaded recess at its lower end, a worm disposed in said recess, an abutment member adjustably secured to said frame and adapted to be engaged by said worm, a handle for turning said worm, a gage member, and a latch member pivotally mounted on said handle and adapted to engage said gage for locking said handle in position.

2. In a work supporting table for channeling machines, a frame provided with a vertical bore, a table having a spindle arranged to slide in said bore and provided with a threaded recess at its lower end, a worm disposed in said recess, a collar disposed on said spindle, a bridge carried by said collar and adapted to be engaged by said worm, means for suspending said collar from said frame, a handle for turning said worm, a gage member, and a latch member pivotally mounted on said handle and adapted to engage said gage for locking said handle in position.

3. In a work supporting table for channeling machines, a frame provided with a vertical bore, a table having a spindle arranged to slide in said bore and provided with a threaded recess at its lower end, a worm disposed in said recess, a collar disposed on said spindle, a bridge carried by said collar and adapted to be engaged by said worm, means for suspending said collar from said frame, and a spring for holding said collar in a normally raised position.

4. In a work supporting table for channeling machines, a frame provided with a vertical bore, a table having a spindle arranged to slide in said bore and provided with a threaded recess at its lower end, a worm disposed in said recess, a handle for turning said worm, a gage member, and a latch member pivotally mounted on said handle and adapted to engage said gage for locking said handle in position.

5. In a work supporting table for channeling machines, a frame provided with a vertical bore, a table having a spindle arranged to slide in said bore, and provided with a threaded recess at its lower end, a worm disposed in said recess, a collar movable with respect to said spindle and adapted to be engaged by said worm, a handle for moving said worm, an arc-shaped gage member provided with recesses secured to said collar, and a pivoted latch member having a tooth adapted to enter said recesses on said gage member for locking the handle in position.

6. In a work supporting table for channelling machines, a frame provided with a vertical bore, a table having a spindle arranged to slide in said bore and provided with a threaded recess at its lower end, a worm disposed in said recess, a collar disposed on said spindle and movable with respect thereto, a bridge carried by said collar and adapted to engage the lower end of said worm, a handle secured to the worm shaft, an arc-shaped gage member secured to said collar and provided with indicating characters and registering recesses, a latch member pivotally mounted on said handle and having a tooth arranged to engage in said recesses, a swinging arm pivotally secured to said frame, a bell-crank lever carried by said arm, and pivotally connected with said collar, a spring for retaining said bell-crank lever in an upper position, and a foot lever for moving said bell-crank lever.

7. A work support for shoe machines, having, in combination, a frame provided with a suitable bore, a work supporting table having a spindle vertically movable in said bore, a collar loosely surrounding said spindle, a bridge on said collar extending across the bottom of the spindle, adjustable means connecting the bridge and spindle to move the table up or down within said collar, said collar being held against movement relative to the spindle during the operation of the adjusting means, and means for effecting a relative separating movement between the table and machine head to permit entering and withdrawal of the work, without disturbing the adjusted position of the table, substantially as described.

8. A work support for shoe machines, having, in combination, a frame provided with a vertical bore, a work supporting table having a spindle arranged to slide in said bore, said spindle having a threaded recess at its lower end, a worm disposed in said recess, means for holding said worm against vertical movement, means connected to said worm for rotating it in either direction to adjust the table up or down, and means connected to said worm holding means for raising and lowering the table, the worm and the worm rotating means simultaneously relatively to the machine head to permit entering and withdrawal of the work, substantially as described.

9. A work support for shoe machines, having, in combination, a frame provided with a suitable bore, a work supporting table having a spindle vertically movable in said bore, a collar loosely surrounding said spindle, a bridge on said collar extending across the bottom of the spindle, and adjustable means connecting the bridge and spindle to move the table up or down within said collar, said collar being held against movement relative to the spindle during the operation of the adjusting means, substantially as described.

In witness whereof I have signed my name to the specification in the presence of two subscribing witnesses.

ADAM H. PRENZEL.

Witnesses:

LUTHER W. RYAN,
GEORGE W. SHULTZ.

Copies of this patent may be obtained for five cents each, by addressing the "Commissioner of Patents, Washington, D. C."